(12) United States Patent
Mummigatti et al.

(10) Patent No.: US 9,651,132 B2
(45) Date of Patent: May 16, 2017

(54) ALUMINUM DIFFERENTIAL HOUSING WITH CAST IRON INSERTS

(71) Applicant: GM Global Technology Operations LLC, Detroit, MI (US)

(72) Inventors: Mahesh Annasaheb Mummigatti, Bangalore (IN); Sachin Chandrakant Pagare, Nishik (IN)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 14/849,127

(22) Filed: Sep. 9, 2015

(65) Prior Publication Data

US 2017/0067550 A1 Mar. 9, 2017

(51) Int. Cl.
*F16H 48/40* (2012.01)
*F16H 48/08* (2006.01)
*F16H 57/04* (2010.01)

(52) U.S. Cl.
CPC .......... *F16H 48/40* (2013.01); *F16H 48/08* (2013.01); *F16H 57/043* (2013.01); *F16H 57/0483* (2013.01)

(58) Field of Classification Search
CPC ... F16H 48/40; F16H 2048/085; F16H 57/032
See application file for complete search history.

(56) References Cited

U.S. PATENT DOCUMENTS 3,872,741 A * 3/1975 Berchtold ............... F16H 48/08
475/230
5,980,417 A * 11/1999 Wopshall, Jr. .......... F16H 48/08
475/230

\* cited by examiner

*Primary Examiner* — Huan Le

(57) ABSTRACT

A cast aluminum differential housing for a motor vehicle powertrain having cast iron inserts. The housing is cast of light weight aluminum which weighs approximately one-third that of iron which has formerly been used to fabricate such housings. At locations of significant loads and wear, such as the mountings for the stub shaft associated with the two idler bevel gears, iron inserts are cast into the housing. The housing thus weighs significantly less than a comparable iron differential housing but since the two significant wear and load bearing regions include cast iron inserts, the aluminum differential housing of the present invention has the ruggedness, durability and service life of the much heavier iron housing.

19 Claims, 4 Drawing Sheets

ALUMINUM DIFFERENTIAL HOUSING WITH CAST IRON INSERTS

FIELD

The present disclosure relates to differential housings for motor vehicle powertrains and more particularly to lightweight cast aluminum differential housings for motor vehicle powertrains having cast iron inserts.

BACKGROUND

The statements in this section merely provide background information related to the present disclosure and may or may not constitute prior art.

Virtually every motor vehicle having a conventional powertrain includes a at least one differential which both directs drive torque to left and right front or rear wheels and allows the wheels to rotate at different speeds without scrubbing or winding up the rear axles as the vehicle turns and negotiates corners. The differential includes a cage or housing which is driven through a hypoid and ring gear assembly and contains two bevel idler gears in constant mesh with two gears connected to the left and right axles which drive the associated wheels. The cage or housing is typically cast iron and includes journal bearings which support a stub shaft upon which the idler gears are disposed. Because of the power applied to the differential and the forces experienced by the gears, shafts and bearings associated with them, the choice of cast iron for the housing is generally accepted as good engineering.

Unfortunately, because of its size, the weight of a cast iron differential housing can be significant. As is well known, automobile manufacturers are under constant and increasing pressure to improve the fuel economy of their vehicles and one of the most direct paths to improved fuel economy is to reduce the weight of the vehicle. Such weight reduction, however, cannot be done at the expense of the ruggedness and service life of the vehicle and its components. Thus, one true challenge of improved fuel economy is the reduction of vehicle weight without any impact on the quality of the vehicle, its ruggedness and service life.

The present invention is directed to both weight reduction of the differential cage or housing and maintenance of its quality and ruggedness.

SUMMARY

The present invention provides a cast aluminum differential cage of housing. The housing is cast of light weight aluminum which weighs approximately one-third that of iron which has formerly been used to fabricate such housings. At locations of significant loads and wear, such as the mountings for the stub shaft associated with the two idler bevel gears, iron inserts are cast into the housing. The housing thus weighs significantly less than a comparable iron differential cage housing but since the two significant wear and load bearing regions include cast iron inserts, the aluminum differential housing of the present invention has the ruggedness, durability and service life of the much heavier prior art iron housing.

Thus it is an aspect of the present invention to provide an aluminum differential housing.

It is a further aspect of the present invention to provide a cast aluminum differential housing.

It is a still further aspect of the present invention to provide an aluminum differential housing for a motor vehicle powertrain.

It is a still further aspect of the present invention to provide a light weight cast aluminum differential housing for a motor vehicle powertrain.

It is a still further aspect of the present invention to provide an aluminum differential housing having at least two cast iron inserts.

It is a further aspect of the present invention to provide a cast aluminum differential housing having at least two cast iron inserts.

It is a still further aspect of the present invention to provide an aluminum differential housing for a motor vehicle powertrain having cast iron inserts.

It is a still further aspect of the present invention to provide a light weight cast aluminum differential housing for a motor vehicle powertrain having cast iron inserts.

It is a still further aspect of the present invention to provide an aluminum differential housing for a motor vehicle powertrain having cast iron inserts which support an idler gear stub shaft.

It is a still further aspect of the present invention to provide a light weight cast aluminum differential housing for a motor vehicle powertrain having cast iron inserts which support the idler gear stub shaft.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
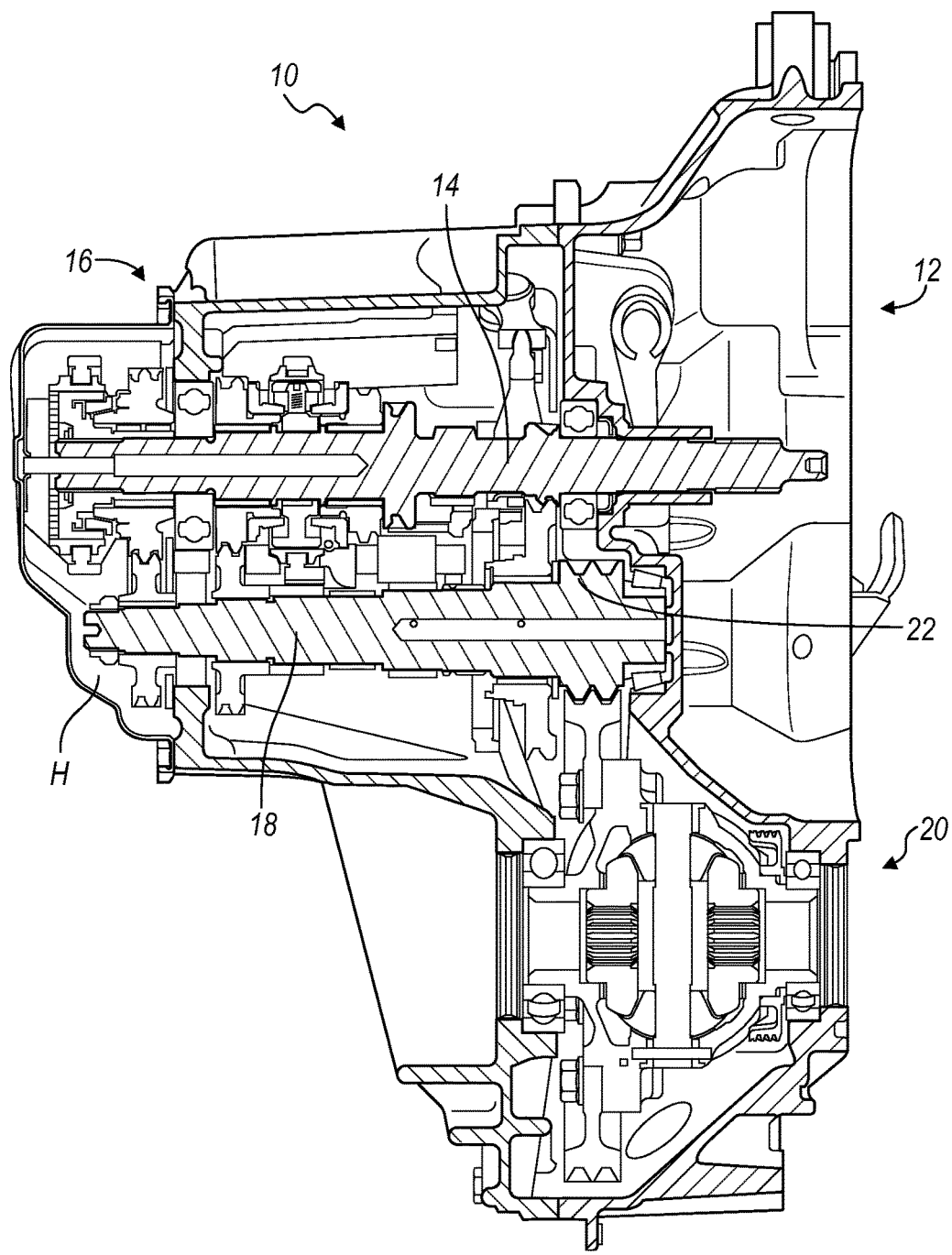
FIG. 1 is a diagrammatic view of a front wheel drive motor vehicle transmission and differential according to the present invention.
Figure 2:
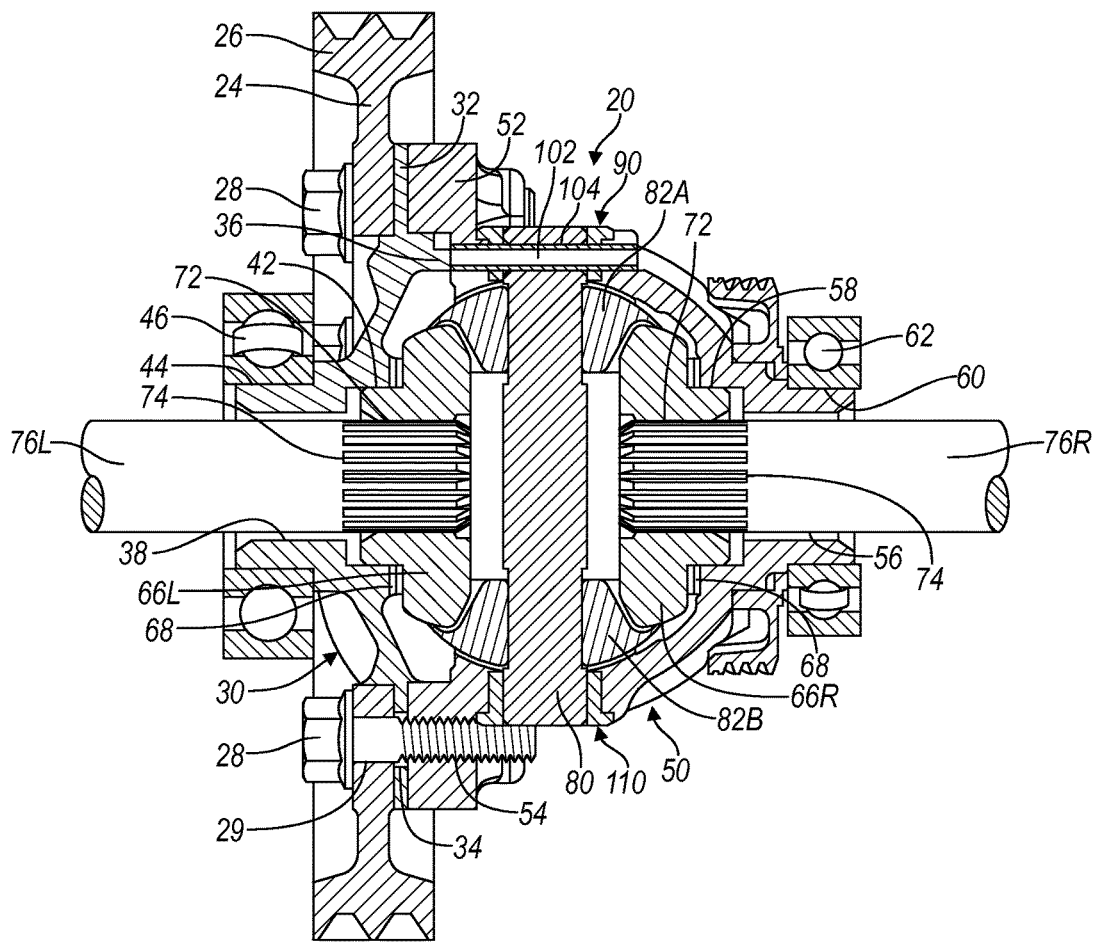
FIG. 2 is a full sectional view of a motor vehicle differential having a differential cage or housing according to the present invention.
Figure 3A:
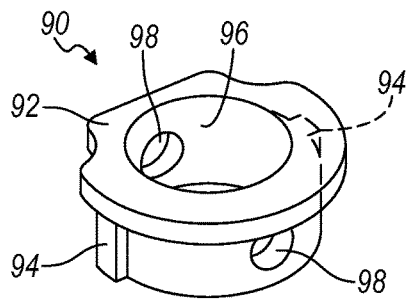
FIGS. 3A and 3B are perspective views of the two iron inserts which support the idler gear stub shaft.
Figure 3B:
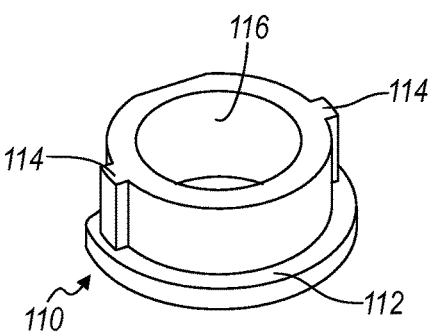

With reference to FIGS. 1 and 2, a front wheel drive motor vehicle automatic transmission and differential assembly is illustrated and designated by the reference number 10. The automatic transmission and differential assembly 10 includes a cast metal, multiple piece housing H which supports, locates and protect the various components of the assembly 10. The components of the manual transmission and differential assembly 10 include a clutch 12 which drives an input shaft 14, a plurality of mating gear assemblies 16 and an output shaft 18 which drives a differential 20 incorporating to the present invention.

The output shaft 18 of the transmission assembly 10 includes a spur or hypoid gear 22 which engages and drives a ring gear 24. The ring gear 24 includes gear teeth 26 complementary to the teeth on the hypoid gear 22 and is secured by a plurality of threaded fasteners 28 which extend through openings 29 in the ring gear 24, through a first differential hub or housing 30 and into a second differential cage or housing 50.

The first differential hub or housing 30 includes a relatively thin outer flange 32 having a plurality of through openings or apertures 34 aligned with the openings 29 and the threaded fasteners 28. Adjacent the outer flange 32 is a projection or lug 36, the purpose of which will be explained subsequently. The differential hub or housing 30 also includes a center opening 38 adapted to receive an axle, an interior shoulder and wall 42 and an exterior shoulder and circumferential wall 44 which receives an anti-friction ball bearing assembly 46 which is supported in the housing H.

Referring now to FIG. 2, the second differential cage or housing 50 is generally hemi-spherical in shape and includes a flange 52 which is complementary to and engages the outer flange 32 of the first differential hub or housing 30 and the ring gear 24 and includes a plurality of threaded through openings 54 which receive the threaded fasteners 28 which secure the ring gear 24 and the first differential hub or housing 30 to the second differential cage or housing 50.

The second differential cage or housing 50 includes a center through opening 56 adapted to receive an axle, an interior shoulder and wall 58 and an exterior shoulder and circumferential wall 60 which receives a second anti-friction ball bearing assembly 62 which is supported in the housing H. The interior shoulder and wall 42 of the first differential hub or housing 30 and the interior shoulder and wall 58 of the second differential cage or housing 50 symmetrically receive the left and right bevel gears 66L and 66R. Thrust bearings 68 are preferably interposed between the bevel gears 66L and 66R and the inner surface of the first differential hub 30 and the second differential cage 50. Each of the bevel gears 66L and 66R includes female splines 72 which engage and drive complementary male splines 74 on both of the left and right drive axles 76L and 76R.

Referring now to FIGS. 2, 3A, 3B and 4, disposed perpendicularly to the axis of the drive axles 76L and 76R is a stub shaft 80 which receives and locates a pair of bevel idler gears 82A and 82B. Both of the idler gears 82A and 82B are in constant mesh with the left and right bevel gears 66L and 66R. The stub shaft 80 is supported on a pair of cast iron inserts which are cast in place in the second differential cage or housing 50.

A first cast iron insert 90 includes an end flange 92, a pair of diametrically opposed, axially extending webs or ribs 94, a through circular opening 96 which receives the stub shaft 80 and an aligned pair of transverse openings 98 which receive a retaining pin 102. The end flange 92 assists and ensures the proper location of the first insert 90 in a mold (not illustrated) during die casting of the second differential cage or housing 50 and the webs or ribs 94 assist secure attachment of the first insert 90 in the second differential cage or housing 50 and prevent its rotation. The retaining pin 102 extends through the aligned openings 98 in the first insert 90 and a complementary aligned opening 104 in the stub shaft 80 to retain the stub shaft in the second differential cage or housing 50. The projection or lug 36 of the first differential hub or housing 30 engages the retaining pin 102 and maintains it in the position illustrated in FIG. 2.

A second cast iron insert 110 includes an end flange 112, a pair of diametrically opposed, axially extending webs or ribs 114 and a through circular opening 116 which receives the stub shaft 80. The end flange 112 assists and ensures the proper location of the second insert 110 in the mold (not illustrated) during die casting of the second differential cage or housing 50 and the webs or ribs 114 assist secure attachment of the second insert 110 in the second differential cage or housing 50 and prevent its rotation.

Figure 4:
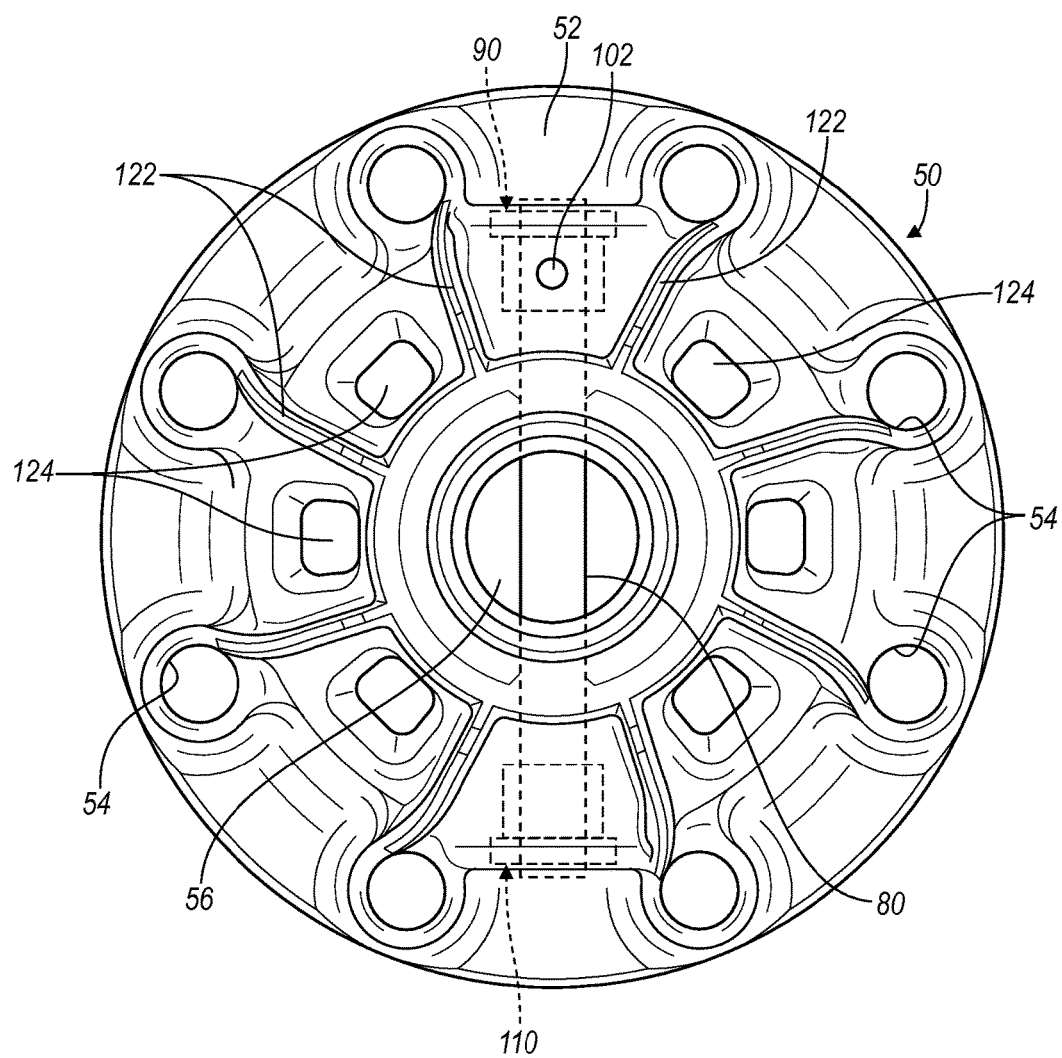
FIG. 4 is a plan view with portions broken away of a motor vehicle differential cage or housing according to the present invention.

Referring now to FIGS. 2 and 4, the second differential cage or housing 50, as noted above, includes a plurality of threaded through openings 54 arranged in a bolt circle. The cage or housing 50 also includes a plurality of obliquely oriented strengthening ribs 122. Preferably, one of the ribs 122 is associated with each of the openings 54. Disposed between each of the strengthening ribs 122 is an opening or aperture 124 which facilitates movement of lubrication oil through the second differential cage or housing 50 and into and out of the interior of the differential cage or housing 50 where the gears 66L, 66R, 82A and 82B and the stub shaft 80 reside.

Figure 5:
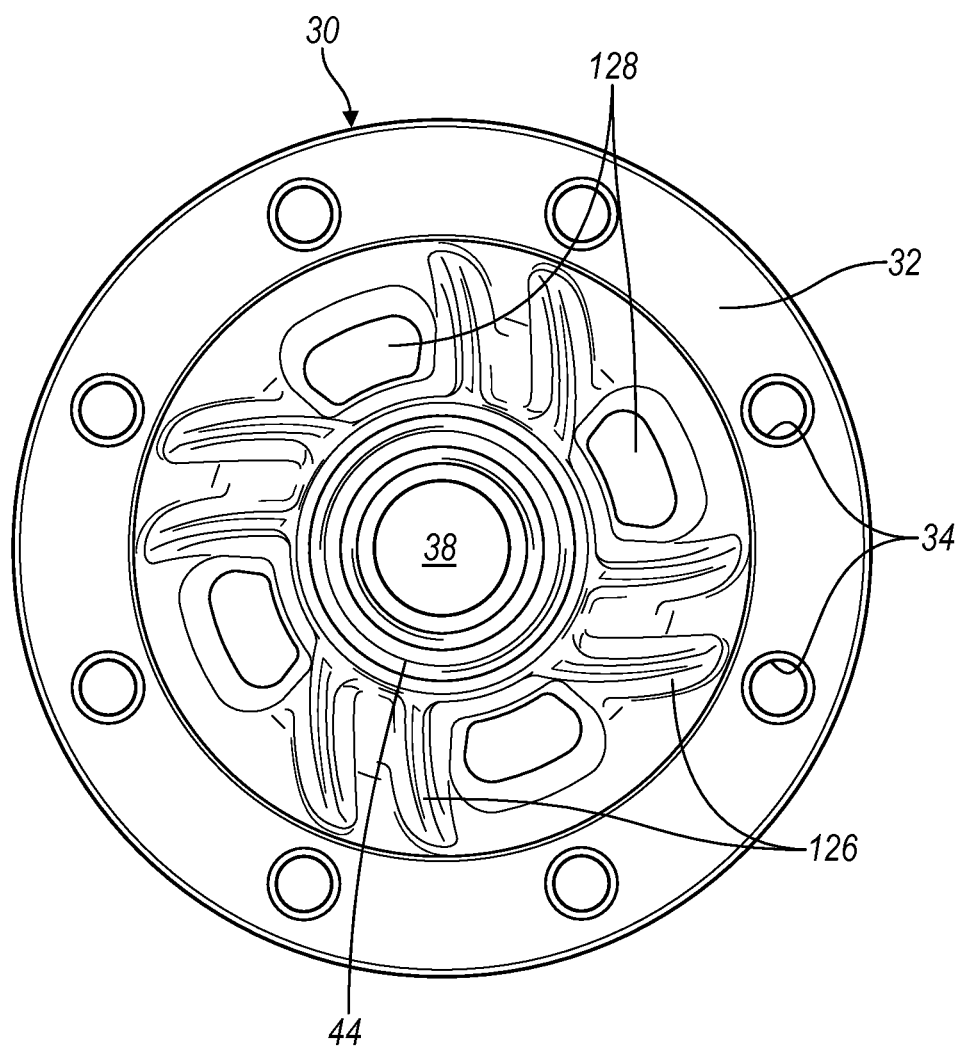
FIG. 5 is a plan view of a motor vehicle differential hub or housing according to the present invention.

Referring now to FIGS. 2 and 5, the first differential hub or housing 30, as noted above, includes the outer flange 32 having the plurality of through openings or apertures 34, the center opening 38 adapted to receive the axle 76L, and the exterior shoulder and circumferential wall 44 which receives the anti-friction ball bearing assembly 46. The differential hub or housing 30, like the differential cage or housing 50, also includes a plurality of obliquely oriented strengthening ribs 126 which alternate with a like plurality of openings or apertures 128 which facilitate movement of lubrication oil into and out of the differential hub or housing 30.

The first differential hub or housing 30 and the second differential cage or housing 50 are preferably die cast of an aluminum alloy such as ANSI 383 or a similar material having good strength and casting characteristics. The iron inserts 90 and 110 are preferably fabricated of nodular cast iron having approximately 3.3% carbon, approximately 2.30% silicon, approximately 0.60% manganese and other trace elements or a similar material. As noted above, the iron inserts 90 and 110 are cast in place in the second differential cage or housing 50. By "cast in place," it is meant that the iron inserts 90 and 110 are first cast and finished by any suitable machining or surface finishing process and then are appropriately positioned in the mold (not illustrated) for the second differential cage or housing 50 which is subsequently filled with aluminum.

A differential 20 incorporating the first differential hub or housing 30 and the second differential cage or housing 50 provides many improvements and enhancements over a prior art iron differential cage. First of all, the weight of an iron differential cage may be approximately 1800 grams whereas the differential hub 30 and the differential cage 50 weigh approximately 800 grams. This represents a weight reduction of 1 kilogram or about 55%. Second of all, because the differential hub 30 and the differential cage 50 are separate, smaller castings than the prior art cage, the accuracy and integrity of the castings are improved, resulting in fewer castings rejected for defects. Furthermore, the strengthening ribs 122 concentrate metal in regions of higher stress whereas the lubrication openings 124 are in regions of lower stress. This combination of features improves the overall strength and rigidity of the differential cage or housing 50 while reducing its weight. Finally, of course, the reduced weight of the differential hub 30 and the differential cage 50 stated above reduces vehicle weight and improves fuel economy.

The description of the invention is merely exemplary in nature and variations that do not depart from the gist of the invention are intended to be within the scope of the invention. Such variations are not to be regarded as a departure from the spirit and scope of the invention.

What is claimed is:

1. A differential assembly comprising, in combination, a ring gear having a plurality of teeth and a first plurality of openings oriented parallel to a first axis,
a differential hub having a first flange with a second plurality of openings oriented parallel to said first axis and a first center opening on said first axis adapted to receive a first axle,
a differential housing having a second flange with a third plurality of openings oriented parallel to said first axis, said openings including threads, a second center opening on said first axis adapted to receive a second axle, a pair of iron inserts, each of said inserts having an end flange proximate an outside surface of said differential housing, a plurality of external, axially extending ribs and a pair of through openings on a second axis perpendicular to said first axis, a stub shaft disposed in said through openings in said iron inserts, a pair of idler gears disposed on said stub shaft and a pair of side gears disposed on said first axis and in constant mesh with said pair of idler gears.

2. The differential assembly of claim 1 wherein said differential hub and said differential housing are fabricated of aluminum.

3. The differential assembly of claim 1 wherein said side gears each include a through opening on said first axis and female splines in said through openings.

4. The differential assembly of claim 3 further including a pair of axles having males splines disposed in and engaging said female splines in said side gears.

5. The differential assembly of claim 1 wherein one of said pair of iron inserts includes a pair of aligned openings disposed on an axis perpendicular to said second axis and further including a retaining pin extending between said pair of aligned openings, through said stub shaft and abutting said differential hub.

6. The differential assembly of claim 1 further including a plurality of through lubrication openings in said differential housing.

7. The differential assembly of claim 1 further including a plurality of threaded fasteners extending through said first and second pluralities of openings and into said third plurality of threaded openings in said differential housing.

8. A differential assembly comprising, in combination,
a ring gear having a plurality of teeth and defining a first axis,
a first aluminum differential component coupled to said ring gear and having a first flange with a first plurality of openings oriented parallel to said first axis and a first center opening on said first axis,
a second aluminum differential component having a second flange with a second plurality of openings oriented parallel to said first axis, said openings including threads, a second center opening on said first axis, a pair of iron inserts, each of said inserts having an end flange proximate an outside surface of said second aluminum differential component, a plurality of external, axially extending ribs and a pair of through openings on a second axis perpendicular to said first axis, a stub shaft disposed in said through openings in said iron inserts, a pair of idler gears disposed on said stub shaft and a pair of side gears disposed on said first axis and in a respective one of said center openings in said differential hub and housing and in constant mesh with said pair of idler gears.

9. The differential assembly of claim 8 wherein said side gears include a through opening on said first axis and female splines in said through openings.

10. The differential assembly of claim 9 further including a pair of axles having males splines disposed in and engaging said female splines in through openings in said side gears.

11. The differential assembly of claim 8 wherein one of said pair of iron inserts includes a pair of aligned openings disposed on an axis perpendicular to said second axis and further including a retaining pin extending between said pair of aligned openings, through said stub shaft and abutting said first aluminum differential component.

12. The differential assembly of claim 8 further including a plurality of through lubrication openings in said differential housing.

13. The differential assembly of claim 8 further including a plurality of threaded fasteners extending through said first plurality of openings in said differential hub and into said second plurality of threaded openings in said differential housing.

14. A differential assembly comprising, in combination,
a ring gear having a first plurality of openings oriented parallel to a first axis,
an aluminum differential hub having a first flange with a second plurality of openings oriented parallel to said first axis and a first center opening on said first axis,
an aluminum differential housing having a second flange with a third plurality of openings oriented parallel to said first axis, said openings including threads, a second center opening on said first axis, a pair of iron inserts, each of said inserts having an end flange proximate an outside surface of said differential housing, a plurality of external, axially extending ribs and a pair of through openings on a second axis perpendicular to said first axis, a stub shaft disposed in said through openings in said iron inserts, a pair of idler gears disposed on said stub shaft and a pair of side gears disposed in respective said center openings in said differential hub and housing and in constant mesh with said pair of idler gears.

15. The differential assembly of claim 14 wherein said side gears each include a through opening on said first axis and female splines in said through openings.

16. The differential assembly of claim 15 further including a pair of axles having males splines disposed in and engaging said female splines in said through openings of said side gears.

17. The differential assembly of claim 14 wherein one of said pair of iron inserts includes a pair of aligned openings disposed on an axis perpendicular to said second axis and further including a retaining pin extending between said pair of aligned openings, through said stub shaft and abutting said aluminum differential hub.

18. The differential assembly of claim 14 further including a plurality of through lubrication openings in said differential housing.

19. The differential assembly of claim 14 further including a plurality of threaded fasteners extending through said first and second pluralities of openings and into said third plurality of threaded openings in said differential housing.

* * * * *